United States Patent [19]

Fujita et al.

[11] Patent Number: 5,298,557
[45] Date of Patent: Mar. 29, 1994

[54] THERMOPLASTIC RESIN COMPOSITION

[75] Inventors: Yuji Fujita; Tetsuya Kawamura; Kouichi Yokoyama; Katsuyuki Yokomizo; Shigeyuki Toki, all of Ooi, Japan

[73] Assignee: Tonen Corporation, Tokyo, Japan

[21] Appl. No.: 648,932

[22] Filed: Feb. 1, 1991

[30] Foreign Application Priority Data

Feb. 2, 1990 [JP] Japan .................................. 2-24063
Feb. 2, 1990 [JP] Japan .................................. 2-24064

[51] Int. Cl.$^5$ ....................... C08L 23/12; C08L 67/02
[52] U.S. Cl. ........................................ 525/64; 525/69
[58] Field of Search ............................... 525/64, 69

[56] References Cited

U.S. PATENT DOCUMENTS 5,106,909 4/1992 Sezume .......................... 525/176

FOREIGN PATENT DOCUMENTS

| | | |
|---|---|---|
| 0177151 | 4/1986 | European Pat. Off. . |
| 0308179 | 3/1989 | European Pat. Off. . |
| 0333414 | 9/1989 | European Pat. Off. . |
| 59-215351 | 12/1984 | Japan . |
| 60-58447 | 4/1985 | Japan . |
| 61-60744 | 3/1986 | Japan . |
| 61-60746 | 3/1986 | Japan . |
| WO90/12054 | 10/1890 | World Int. Prop. O. . |

OTHER PUBLICATIONS

World Patents Index Latest, Derwent Publications Ltd., London, GB: & AN 85-021104 & JP-A-59 215351, Dec. 5, 1984.

Primary Examiner—Patricia A. Short
Attorney, Agent, or Firm—Armstrong, Westerman, Hattori, McLeland & Naughton

[57] ABSTRACT

The thermoplastic resin composition of the present invention is made of:
(a) 5-95 weight % of polypropylene;
(b) 95-5 weight % of a polyester; and
(c) 2-70 parts by weight, per 100 parts by weight of the total of (a)+(b), of a polyolefin-polyester graft copolymer.

The polyolefin-polyester graft copolymer is constituted by (A) 10-90 parts by weight of a polyester having an intrinsic viscosity $[\eta]$ of 0.30-1.20 and an end carboxyl group content of 15-200 milliequivalent/kg; and (B) 90-10 parts by weight of a modified polyolefin having an epoxy group or carboxyl group content of 0.2-5 mol % and a weight-average molecular weight of 8,000-140,000. This thermoplastic resin composition may further contain (d) a modified polypropylene grafted with an unsaturated carboxylic acid or its anhydride.

1 Claim, No Drawings

THERMOPLASTIC RESIN COMPOSITION

BACKGROUND OF THE INVENTION

The present invention relates to a thermoplastic resin composition comprising a polyester and polypropylene, and more particularly to a thermoplastic resin composition comprising a polyester and polypropylene extremely compatible with each other.

Polypropylene resins have excellent moldability, chemical resistance, water resistance, etc., but they are poor in mechanical properties such as flexural modulus, impact resistance, etc. To improve such properties of the polypropylene resins, attempts have been made to blend the polypropylene resins with polyesters having excellent impact resistance, mechanical strength, etc.

However, since the polypropylene and the polyester do not have good compatibility, proposals have been made to add a modified polyolefin which is grafted with an unsaturated carboxylic acid or its anhydride to improve their compatibility.

Japanese Patent Laid-Open No. 60-58447 discloses a thermoplastic resin composition comprising (A) polypropylene, (B) a thermoplastic polyester, (C) a modified propylene-α-olefin random copolymer, (D) a hydrogenated styrenebutadiene block copolymer, and (E) an inorganic filler, the modified propylene-α-olefin random copolymer (C) being produced by grafting a propylene-α-olefin random copolymer (G) having a crystallization degree of 0 to 30 weight % measured by X-ray analysis and a propylene content of 50 to 70 mol % with 0.01 to 5 weight % of a graft monomer selected from unsaturated carboxylic acids or their derivatives, the component (C) being 1 to 80 parts by weight, the component (D) being 1 to 50 parts by weight, and the component (E) being 5 to 150 parts by weight, per 100 parts by weight of the total of components (A) and (B).

Also, various proposals have been made to add epoxy group-containing copolymers as compatibilizers to the thermoplastic resin compositions of polypropylenes and polyesters.

Japanese Patent Laid-Open No. 61-60744 discloses a thermoplastic resin composition comprising (A) 10–90 weight % of polypropylene, (B) 90–10 weight % of a saturated polyester resin, and (C) 2–30 parts by weight, per 100 parts by weight of the polypropylene (A)+the saturated polyester resin (B), of an epoxy group-containing copolymer.

Japanese Patent Laid-Open No. 61-60746 discloses a thermoplastic resin composition comprising (A) 50–90 weight % of a polypropylene resin selected from a modified polypropylene and a modified polypropylene/polypropylene composition; (B) 50–10 weight % of a saturated polyester resin; and (C) 2–30 parts by weight, per 100 parts by weight of the polypropylene resin (A)+the saturated polyester resin (B), of an epoxy group-containing copolymer.

However, these thermoplastic resin compositions fail to show sufficiently improved flexural modulus and impact resistance. In addition, since sufficient compatibility of the polypropylene with the polyester cannot be achieved, the resulting thermoplastic resin compositions are likely to suffer from surface peel.

OBJECT AND SUMMARY OF THE INVENTION

Accordingly, an object of the present invention is to provide a thermoplastic resin composition comprising polypropylene and polyester sufficiently compatibilized with each other and having excellent mechanical strength, impact resistance and surface peel resistance.

As a result of intense research in view of the above object, the inventors of the present invention have found that by adding to a mixture of polypropylene and a polyester a polyolefin-polyester graft copolymer consisting of a polyester having a particular level of an end carboxyl group content and a modified polyolefin containing an epoxy group or carboxyl group as their compatibilizer, the compatibility between the polypropylene and the polyester is remarkably improved, thereby providing the resulting thermoplastic resin composition with excellent mechanical strength, impact resistance and surface peel resistance, and that by further adding a modified polypropylene grafted with an unsaturated carboxylic acid or its anhydride together with the above polyolefin-polyester graft copolymer as their compatibilizers to the polyester/polypropylene composition, better results can be obtained. The present invention has been completed based on this finding.

The thermoplastic resin composition according to one embodiment of the present invention comprises:

(a) 5–95 weight % of polypropylene;
(b) 95–5 weight % of a polyester; and
(c) 2–70 parts by weight, per 100 parts by weight of the total of (a)+(b), of a polyolefin-polyester graft copolymer, the polyolefin-polyester graft copolymer comprising (A) 10–90 parts by weight of a polyester having an intrinsic viscosity $[\eta]$ of 0.30–1.20 and an end carboxyl group content of 15–200 milliequivalent/kg; and (B) 90–10 parts by weight of a modified polyolefin having an epoxy group or carboxyl group content of 0.2–5 mol % and a weight-average molecular weight of 8,000–140,000.

The thermoplastic resin composition according to another embodiment of the present invention comprises:

(a) 5–95 weight % of polypropylene;
(b) 95–5 weight % of a polyester;
(c) a polyolefin-polyester graft copolymer; and
(d) a modified polypropylene grafted with an unsaturated carboxylic acid or its anhydride, the total of (c)+(d) being 2–100 parts by weight per 100 parts by weight of (a)+(b), a weight ratio (c)/(d) being 5/95–95/5, the polyolefin-polyester graft copolymer comprising (A) 10–90 parts by weight of a polyester having an intrinsic viscosity $[\eta]$ of 0.30–1.20 and an end carboxyl group content of 15–200 milliequivalent/kg; and (B) 90–10 parts by weight of a modified polyolefin having an epoxy group or carboxyl group content of 0.2–5 mol % and a weight-average molecular weight of 8,000–140,000.

DETAILED DESCRIPTION OF THE INVENTION

In one embodiment of the present invention, the thermoplastic resin composition comprises (a) 5–95 weight % of polypropylene, (b) 95–5 weight % of a polyester, and (c) 2–70 parts by weight, per 100 parts by weight of the total of (a)+(b), of a polyolefin-polyester graft copolymer.

The polypropylene (a) is not restricted to a homopolymer of propylene, and any random or block copolymers of propylene and other α-olefins, in which the propylene content is 50 mol % or more, preferably 80 mol % or more, may be used. The polypropylene may contain up to 40 weight % of olefinic elastomers such as an ethylene-propylene-diene terpolymer rubber, an ethylene-propylene copolymer rubber, an ethylene-butene copolymer rubber, etc. Comonomers which may be copolymerized with propylene are ethylene and other α-olefins, and ethylene is particularly preferable. Accordingly, the term "polypropylene" used herein means that it is not restricted to a homopolymer of propylene but it includes any types of propylene copolymers.

The polyesters (b) which may be used in the present invention are generally thermoplastic resins consisting of saturated dicarboxylic acids and saturated bivalent alcohols. Their examples include polyethylene terephthalate, polypropylene terephthalate, polytetramethylene terephthalate (polybutylene terephthalate), polyhexamethylene terephthalate, polycyclohexane-1,4-dimethylol terephthalate, polyneopentyl terephthalate, etc. Among them, polyethylene terephthalate and polybutylene terephthalate are particularly preferable.

The polyesters should have an intrinsic viscosity [η] of 0.3–1.2. Here, the intrinsic viscosity [η](dl/g) is determined from a solution viscosity measured in an o-chlorophenol solvent at 25° C.

Particularly, in the case of the polyethylene terephthalate, it preferably has an intrinsic viscosity [η] of 0.3–0.8. Incidentally, the terephthalic acid component in the polyethylene terephthalate may have substituents of an alkyl group, a halogen group, etc., and the glycol component may contain, in addition to ethylene glycol, up to about 50 weight % of other glycols such as 1,4-butylene glycol, propylene glycol, hexamethylene glycol, etc.

In the case of the polybutylene terephthalate, it preferably has an intrinsic viscosity [η] of 0.3–1.2. The terephthalic acid component may also have substituents of an alkyl group, a halogen group, etc., and the glycol component may contain, in addition to 1,4-butylene glycol, up to about 50 weight % of other glycols such as ethylene glycol, propylene glycol, hexamethylene glycol, etc.

With respect to the contents of the polypropylene and the polyester, the polypropylene is 5–95 weight %, preferably 10–90 weight %, and the polyester is 95–5 weight %, preferably 90–10 weight %, based on 100 weight % of the polypropylene+the polyester. When the polypropylene is less than 5 weight % (when the polyester exceeds 95 weight %), the moldability undesirably decreases, and when the polypropylene exceeds 95 weight % (when the polyester is less than 5 weight %), sufficient impact strength and flexural modulus cannot be achieved.

The polyolefin-polyester graft copolymer (c) used in the present invention comprises (A) 10–90 parts by weight of a polyester having an intrinsic viscosity [η] of 0.30–1.20 and an end carboxyl group content of 15–200 milliequivalent/kg, and (B) 90–10 parts by weight of a modified polyolefin having an epoxy group or carboxyl group content of 0.2–5 mol % and a weight-average molecular weight of 8,000–140,000.

The polyesters (A) constituting the polyolefin-polyester graft copolymer (c) used in the present invention may be the same as the component (b), and their examples include polyethylene terephthalate, polypropylene terephthalate, polytetramethylene terephthalate (polybutylene terephthalate), polyhexamethylene terephthalate, polycyclohexane-1,4-dimethylol terephthalate, polyneopentyl terephthalate, etc., and particularly polyethylene terephthalate and polybutylene terephthalate are preferable.

The above polyesters (A) should have an intrinsic viscosity [η] of 0.30–1.20 and an end carboxyl group content of 15–200 milliequivalent/kg.

When the intrinsic viscosity [η] of the polyester (A) is lower than 0.30, sufficient effects on improving the compatibility of the polypropylene (a) with the polyester (b) cannot be achieved, and when it exceeds 1.20, the resulting polyolefin-polyester graft copolymer shows too high melt viscosity, resulting in difficulty in molding.

With respect to the concentration of end carboxyl groups, when it is lower than 15 milliequivalent/kg, the polyester (A) shows poor reactivity with the modified polyolefin (B). On the other hand, when it exceeds 200 milliequivalent/kg, too high reactivity with the modified polyolefin (B) is obtained, which in turn contributes to the formation of excess gels.

Particularly, in a case where the polyester (A) in the polyolefin-polyester graft copolymer (c) is polyethylene terephthalate, the polyethylene terephthalate should have an intrinsic viscosity [η] of 0.30–0.80 and an end carboxyl group content of 15–200 milliequivalent/kg. When the intrinsic viscosity [η] exceeds 0.80, the graft copolymer shows too high melt viscosity, leading to the formation of gels. Incidentally, as in the case of the polyester (b), the terephthalic acid component in the polyethylene terephthalate may have substituents of an alkyl group, a halogen group, etc., and the glycol component may contain, in addition to ethylene glycol, up to about 50 weight % of other glycols such as 1,4-butylene glycol, propylene glycol, hexamethylene glycol, etc.

In a case where the polyester (A) in the polyolefin-polyester graft copolymer (c) is polybutylene terephthalate, the polybutylene terephthalate should have an intrinsic viscosity [η] of 0.30–1.20 and an end carboxyl group content of 15–200 milliequivalent/kg. The terephthalic acid component may also have substituents of an alkyl group, a halogen group, etc., and the glycol component may contain, in addition to 1,4-butylene glycol, up to about 50 weight % of other glycols such as ethylene glycol, propylene glycol, hexamethylene glycol, etc.

The modified polyolefins (B) are polyolefins modified with unsaturated monomers containing epoxy groups or carboxyl groups.

The unsaturated monomers containing carboxyl groups include unsaturated carboxylic acids or their anhydrides, for instance, monocarboxylic acids such as acrylic acid, methacrylic acid, etc., dicarboxylic acids such as maleic acid, fumaric acid, itaconic acid, etc., dicarboxylic anhydrides such as maleic anhydride, itaconic anhydride, endo-bicyclo-[2,2,1]-5-heptene-2,3-dicarboxylic anhydride, etc. Particularly, dicarboxylic acids and their anhydrides are preferable.

The unsaturated monomers containing epoxy groups include glycidyl methacrylate, glycidyl acrylate, etc.

The olefins which are copolymerizable with the above unsaturated monomers containing epoxy groups or carboxyl groups to produce the modified polypropylene (B) include olefins such as ethylene, propylene, butene-1, pentene-1, etc., and these olefins may be used alone or in combination. Also usable is a propylene random copolymer containing an unconjugated diene comonomer represented by the following general formula:

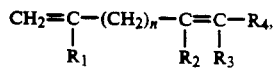

wherein $R_1$-$R_4$ are H or alkyl groups having 1-6 carbon atoms, and n is an integer of 1-20.

The unconjugated dienes contained in the above propylene random copolymer (PPDM) include 2-methyl-1,4-pentadiene, 1,4-hexadiene, 4-methylidene-1-hexene, 4-methyl-1,4-hexadiene, 5-methyl-1,4-hexadiene, 1,4-heptadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, 5-methyl-1,4-octadiene, 1,5-heptadiene, 1,5-octadiene, 5-methyl-1,5-heptadiene, 6-methyl-1,5-heptadiene, 2-methyl-1,5-hexadiene, 1,6-octadiene, 6-methyl-1,6-octadiene, 7-methyl-1,6-octadiene, 2-methyl-1,6-heptadiene, 1,9-decadiene, 1,13-tetradecadiene, etc. Among them, 1,4-hexadiene, 2-methyl-1,5-hexadiene, 7-methyl-1,6-octadiene, 1,9-decadiene, 1,13-tetradecadiene, etc. are particularly preferable. These unconjugated dienes may be used in combination.

In the random copolymerization of propylene with the unconjugated diene, a usual polymerization method using a Ziegler-Natta catalyst can be employed. In this case, the percentage of the unconjugated diene may be 0.05-10 mol %. When it is less than 0.05 mol %, a high graft ratio cannot be achieved in the production of the polyolefin-polyester graft copolymer. On the other hand, when it exceeds 10 mol %, the polyolefin-polyester graft copolymer produced from the propylene random copolymer shows a drastically decreased crystallization degree. The preferred amount of the unconjugated diene in the propylene random copolymer is 0.1-3 mol %.

The propylene random copolymer may further contain up to 5 mol % of other unsaturated monomers such as ethylene, butene-1, etc. The weight-average molecular weight of the propylene random copolymer is usually 100,000-1,000,000.

Incidentally, the olefins may contain 10 weight % or less of other monomers such as vinyl acetate, isoprene, chloroprene, butadiene, etc., if necessary. Among the above modified polyolefins, a copolymer of glycidyl methacrylate and ethylene is particularly preferable.

The modified polyolefin (B) containing epoxy groups or carboxyl groups may be in the form of block copolymer, graft copolymer, random copolymer or alternating copolymer.

The modified polyolefin (B) has a weight-average molecular weight of 8,000-140,000 and an epoxy group or carboxyl group content of 0.2-5 mol %. Incidentally, the weight-average molecular weight is measured by a gel permeation chromatography (GPC), and a measured value is converted to a weight-average molecular weight of an unmodified polyolefin. The epoxy group or carboxyl group content is determined from an oxygen element analysis.

When the weight-average molecular weight of the modified polyolefin (B) is lower than 8,000, sufficient effects on improving the compatibility cannot be obtained, and when it exceeds 140,000, the modified polyolefin (B) shows a high melt viscosity, resulting in poor moldability. With respect to the content of epoxy groups or carboxyl groups, when it is lower than 0.2 mol %, the modified polyolefin (B) shows poor reactivity with the polyester (A), making it difficult to produce the graft copolymer (c). When the epoxy group or carboxyl group content exceeds 5 mol %, the modified polyolefin (B) shows too high reactivity with the polyester (A), increasing the melt viscosity of the reaction product, which in turn leads to the production of gel-like products.

To carry out the graft polymerization of the polyester (A) and the modified polyolefin (B), they are dry-blended and then blended in a molten state at 260°-320° C. for 0.5-15 minutes. The melt blending is carried out in an extruder, particularly in a double-screw extruder. When the reaction temperature is lower than 260° C., a sufficient graft ratio cannot be achieved, and when it exceeds 320° C., excessive reaction takes place, resulting in the clogging of the extruder by the formation of gels and in the deterioration of the polyolefins.

Incidentally, the proportion of the polyester (A) to the modified polyolefin (B) is such that the polyester (A) is 10-90 parts by weight and the modified polyolefin (B) is 90-10 parts by weight. When the polyester (A) is lower than 10 parts by weight or exceeds 90 parts by weight, the amount of the graft copolymer formed undesirably decreases. The preferred amount of the polyester (A) is 10-80 parts by weight, and the preferred amount of the modified polyolefin (B) is 90-20 parts by weight.

The amount of the polyolefin-polyester graft copolymer (c) added is 2-70 parts by weight, preferably 5-50 parts by weight, and most preferably 5-30 parts by weight per 100 parts by weight of the polypropylene (a)+the polyester (b). When the polyolefin-polyester graft copolymer content is less than 2 parts by weight, sufficient effects on improving the compatibility between the polypropylene (a) and the polyester (b) cannot be achieved, and when it exceeds 70 parts by weight, the mechanical properties such as flexural modulus, etc. of the composition decrease.

In another embodiment of the present invention, the thermoplastic resin composition contains a modified polypropylene (d) grafted with an unsaturated carboxylic acid or its anhydride, in addition to the components (a)-(c).

The unsaturated carboxylic acids or their anhydrides used in the production of the modified polypropylene (d) include monocarboxylic acids such as acrylic acid, methacrylic acid, etc., dicarboxylic acids such as maleic acid, fumaric acid, itaconic acid, etc., dicarboxylic anhydrides such as maleic anhydride, itaconic anhydride, endo-bicyclo-(2,2,1)-5-heptene-2,3-dicarboxylic anhydride (himic anhydride), etc. Particularly, maleic anhydride and endo-bicyclo-(2,2,1)-5-heptene-2,3-dicarboxylic anhydride are preferable.

The polypropylene grafted with an unsaturated carboxylic acid or its anhydride is not restricted to a homopolymer of propylene, and any random or block copolymers of propylene and other α-olefins, in which the propylene content is 50 mol % or more and preferably 80 mol % or more, may be used. Comonomers which may be copolymerized with propylene are ethylene and other α-olefins, and ethylene is particularly preferable.

Also usable is a propylene random copolymer containing an unconjugated diene comonomer represented by the following general formula:

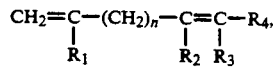

wherein $R_1$–$R_4$ are H or alkyl groups having 1–6 carbon atoms, and n is an integer of 1–20. Incidentally, the olefins may contain up to 10 weight % of other monomers such as vinyl acetate, isoprene, chloroprene, butadiene, etc., if necessary.

The modified polypropylene (d) grafted with an unsaturated carboxylic acid or its anhydride may be in the form of block copolymer, graft copolymer random copolymer or alternating copolymer.

With respect to the graft content of the unsaturated carboxylic acid or its anhydride in the modified polypropylene (d), it is preferably 0.1–5 weight %. Specifically, when the polypropylene is grafted with maleic anhydride or himic anhydride, its graft content is 0.1–5 weight %, preferably 0.2–5 weight %.

When the graft content of unsaturated carboxylic acid or its anhydride is less than the lower limit of 0.1 weight %, sufficient effects of improving the compatibility between the polypropylene and the polyester by the addition of the modified polypropylene (d) cannot be achieved, and when it exceeds the upper limit of 5 weight %, its compatibility with the polypropylene rather decreases.

Incidentally, the modified polypropylene (d) has a melt flow rate of 0.1–1000 g/10 minutes.

The modified polypropylene (d) may be produced by a melt-blending method or a solution method. In the case of a melt-blending method, polypropylene, an unsaturated carboxylic acid monomer (or its anhydride) and a catalyst are introduced into an extruder, a double-screw blender, etc., and the resulting mixture is subjected to melt blending at a temperature of 190°–280° C. In the case of a solution method, the above starting materials are dissolved in an organic solvent such as xylene, etc., and the solution is stirred while heating at a temperature of 100°–140° C. In both cases, usual radical polymerization catalysts may be used for the graft polymerization, and peroxides such as benzoyl peroxide, lauroyl peroxide, di-tert-butyl peroxide, acetyl peroxide, tert-butyl perbenzoate, dicumyl peroxide, perbenzoic acid, peracetic acid, tert-butyl perpivalate, 2,5-dimethyl-2,5-di-(tert-butyl peroxy) hexyne, etc., azo compounds such as azobisisobutyronitrile, etc. are preferable. The amount of the graft polymerization catalyst is 5–50 parts by weight per 100 parts by weight of the unsaturated carboxylic acid or its anhydride.

With respect to the weight ratio (c)/(d) of the polyolefin-polyester graft copolymer (c) to the modified polypropylene (d), it is 5:95–95:5, preferably 10:90–90:10. When the weight ratio is outside the above range, sufficient effects of improving the compatibility between the polypropylene (a) and the polyester (b) cannot be achieved.

The total amount of the polyolefin-polyester graft copolymer (c) and the modified polypropylene (d) added is 2–100 parts by weight, preferably 5–50 parts by weight, most preferably 5–30 parts by weight, per 100 parts by weight of the polypropylene (a)+the polyester (b). When the the total content of (c)+(d) is less than 2 parts by weight, sufficient effects of improving the compatibility between the polypropylene (a) and the polyester (b) cannot be achieved, and when it exceeds 100 parts by weight, the mechanical properties such as flexural modulus, etc. of the resulting composition decrease.

The thermoplastic resin composition of the present invention may further contain other additives such as fillers such as inorganic fillers, carbon black, etc., thermostabilizers, anti-oxidants, photostabilizers, flame retarders, plasticizers, anti-static agents, parting agents, foaming agents, nucleating agents, etc. to improve its properties.

The thermoplastic resin composition of the present invention may be produced by mixing the above components and then heating the resulting mixture kinetically, that is, by blending it in a molten state by using any known means such as an open-type mixing roll, and closed-type ones such as a Banbury mixer, an extruder (including a double-screw extruder), a kneader, a continuous mixer, a Henschel mixer, etc. The blending is conducted at 230°–320° C., preferably 250°–280° C., for 0.5–60 minutes, preferably 1–10 minutes.

The thermoplastic resin composition of the present invention has excellent mechanical properties such as impact resistance and flexural modulus, without suffering from surface peel.

The reasons for providing such excellent properties are not necessarily clear, but it is presumed that by adding to the polypropylene (a) and the polyester (b), the polyolefin-polyester graft copolymer (c) consisting of a polyester (A) having a particular intrinsic viscosity $[\eta]$ and end carboxyl group content and a modified polyolefin (B) having particular epoxy group or carboxyl group content and weight-average molecular weight, good compatibility of the polypropylene (a) with the polyester (b) can be achieved, and that the compatibility is further improved by adding the modified polypropylene (d) grafted with an unsaturated carboxylic acid or its anhydride.

The present invention will be explained in further detail by way of the following Examples.

Incidentally in each of Examples and Comparative Examples, the following polypropylene and polyester were used as starting materials.

[1] Polypropylene
  PP: J209, manufactured by Tonen Sekiyukagaku K. K., melt flow rate (MFR, 230° C., 2.16 kg load)=8.5 g/10 minutes.

[2] Polyester
  (1) Polyethylene terephthalate
  PET: TR 4550, manufactured by Teijin, Ltd., intrinsic viscosity $[\eta]$=0.7.
  (2) Polybutylene terephthalate
  PBT: C7000N, manufactured by Teijin, Ltd., intrinsic viscosity $[\eta]$=1.05.

SYNTHESIS EXAMPLE 1

Production of Polyolefin-Polyester Graft Copolymer 30 parts by weight of polybutylene terephthalate ("TRB-K," manufactured by Teijin, Ltd., intrinsic viscosity $[\eta]$: 0.73) and 70 parts by weight of an ethylene-glycidyl methacrylate random copolymer ("BOND-FAST E," manufactured by Sumitomo Chemical Co., Ltd., weight-average molecular weight: $26.3 \times 10^4$, glycidyl methacrylate content: 12.3 weight %) were introduced into a double-screw extruder of 45 mm in diameter, and subjected to melt blending at 280° C. and 200 rpm to produce a polyethylene-polybutylene terephthalate graft copolymer (hereinafter referred to simply as "Graft Copolymer-1.") The residence time in this extruder was about 2 minutes.

Incidentally, the graft ratio of the polybutylene terephthalate was 45%.

SYNTHESIS EXAMPLE 2
Production of Polyolefin-Polyester Graft Copolymer 30 parts by weight of polybutylene terephthalate ("TRB-K," manufactured by Teijin, Ltd., intrinsic viscosity [η]: 0.73) and 70 parts by weight of an ethylene-acrylic acid random copolymer ("PRIMACOL 3440," manufactured by Dow Chemical, weight-average molecular weight: $7.2 \times 10^4$, acrylic acid content: 8.8 weight %) were introduced into a double-screw extruder of 45 mm in diameter, and subjected to melt blending at 280° C. and 200 rpm to produce a polyethylene-polybutylene terephthalate graft copolymer (hereinafter referred to simply as "Graft Copolymer-2.") The residence time in this extruder was about 2 minutes.

Incidentally, the graft ratio of the polybutylene terephthalate was 25%.

SYNTHESIS EXAMPLE 3
Production of Polyolefin-Polyester Graft Copolymer 30 parts by weight of polyethylene terephthalate ("TR 4550," manufactured by Teijin, Ltd., intrinsic viscosity [η]: 0.7) and 70 parts by weight of an ethylene-glycidyl methacrylate random copolymer ("BOND-FAST E," manufactured by Sumitomo Chemical Co., Ltd.) were introduced into a double-screw extruder of 45 mm in diameter, and subjected to melt blending at 280° C. and 200 rpm to produce a polyethylene-polyethylene terephthalate graft copolymer (hereinafter referred to simply as "Graft Copolymer-3.") The residence time in this extruder was about 2 minutes.

Incidentally, the graft ratio of the polybutylene terephthalate was 32%.

SYNTHESIS EXAMPLE 4
Production of Polyolefin-Polyester Graft Copolymer 20 parts by weight of polybutylene terephthalate ("TRB-K," manufactured by Teijin, Ltd., intrinsic viscosity [η]: 0.73) and 80 parts by weight of a maleic anhydride-grafted polypropylene (polypropylene=-propylene-0.4% unconjugated diene (1,9-decadiene) random copolymer having MFR of 7 g/10 minutes, maleic anhydride content: 0.8 weight %) were introduced into a double-screw extruder of 45 mm in diameter, and subjected to melt blending at 280° C. and 200 rpm to produce a polypropylene-polybutylene terephthalate graft copolymer (hereinafter referred to simply as "Graft Copolymer-4.") The residence time in this extruder was about 2 minutes.

Incidentally, the graft ratio of the polybutylene terephthalate was 24%.

SYNTHESIS EXAMPLE 5
Production of Modified Polypropylene 100 parts by weight of a polypropylene, 3 parts by weight of maleic anhydride, and 1 part by weight of "PERHEXYNE 25B" (manufactured by Nippon Oil and Fats Co., Ltd.) were dry-blended, and the resulting mixture was introduced into a double-screw extruder of 65 mm in diameter and subjected to blending in a molten state at 230° C. and 100 rpm to conduct a graft reaction. The resulting graft copolymer was maleic anhydride-modified polypropylene (hereinafter simply referred to as "CMPP-1").

Incidentally, the average reaction time was about 1 minute, and the graft ratio of maleic anhydride was 0.68%.

SYNTHESIS EXAMPLE 6
Production of Modified Polypropylene 100 parts by weight of a polypropylene (propylene-0.4% unconjugated diene (1,9-decadiene) random copolymer) having MFR of 7 g/10 minutes, 3 parts by weight of maleic anhydride, and 0.1 parts by weight of "PERHEXYNE 25B" (manufactured by Nippon Oil and Fats Co., Ltd.) were dry-blended, and the resulting mixture was introduced into a double-screw extruder of 65 mm in diameter and subjected to blending in a molten state at 200° C. and 100 rpm to conduct a graft reaction. The resulting graft copolymer was maleic anhydride-modified polypropylene (hereinafter simply referred to as "CMPP-2").

Incidentally, the average reaction time was about 1 minute, and the graft ratio of maleic anhydride was 1.5%.

EXAMPLES 1-12 AND COMPARATIVE EXAMPLES 1-5

Polypropylene, a polyester and a polyolefin-polyester graft copolymer were dry-blended in proportions shown in Table 1. Each of the resulting mixtures was then introduced into a double-screw extruder of 45 mm in diameter, and subjected to blending in a molten state at 280° C. and 200 rpm to produce composition pellets.

Next, each of the resulting compositions was formed into test pieces for various property tests.

Each test piece was measured with respect to Izod impact strength, flexural modulus, bending strength, thermal deformation temperature and surface peel resistance. The results are shown in Table 1 together with the melt flow rate of each composition.

Further, for comparison, test pieces were produced in the same manner as in Example 1 from various compositions comprising the polypropylene and the polyester without the polyolefin-polyester graft copolymers (Comparative Examples 1-4), and the same composition as in Example 1 except for containing a maleic anhydride-grafted polypropylene (maleic anhydride graft ratio: 0.3 weight %, hereinafter referred to simply as "MAHPP") in place of the polyolefin-polyester graft copolymer (Comparative Example 5). Each of the test pieces was measured with respect to Izod impact strength, flexural modulus, bending strength, thermal deformation temperature and surface peel resistance. The results are also shown in Table 1.

TABLE 1

| | Example No. | | | | | | | |
|---|---|---|---|---|---|---|---|---|
| | 1 | 2 | 3 | 4 | 5 | 6 | 7 | 8 |
| Composition (weight %) | | | | | | | | |
| PP | 85 | 65 | 45 | 25 | 60 | 50 | 65 | 65 |
| Polyester | | | | | | | | |

TABLE 1-continued

|  |  |  |  |  |  |  |  |  |
|---|---|---|---|---|---|---|---|---|
| PET | — | — | — | — | — | — | — | — |
| PBT | 10 | 30 | 50 | 70 | 30 | 30 | 30 | 30 |
| Graft Copolymer-1 | 5 | 5 | 5 | 5 | 10 | 20 | — | — |
| Graft Copolymer-2 | — | — | — | — | — | — | 5 | — |
| Graft Copolymer-3 | — | — | — | — | — | — | — | 5 |
| Graft Copolymer-4 | — | — | — | — | — | — | — | — |
| MAHPP | — | — | — | — | — | — | — | — |
| Properties |  |  |  |  |  |  |  |  |
| MFR (g/10 minutes)[1] | 18.0 | 25.8 | 25.9 | 22.7 | 20.4 | 12.4 | 27.4 | 30.9 |
| Surface Peel Resistance[2] | 98/100 | 80/100 | 75/100 | 95/100 | 95/100 | 100/100 | 75/100 | 72/100 |
| Izod Impact Resistance[3] (kgf·cm/cm) (−30° C.) | 2.7 | 2.5 | 2.8 | 4.5 | 3.7 | 4.5 | 2.5 | 2.5 |
| Bending Strength[4] (kgf/cm$^2$) | 281 | 305 | 250 | 425 | 317 | 304 | 295 | 279 |
| Flexural Modulus[5] (kgf/cm$^2$) | 12900 | 16000 | 18300 | 20800 | 15400 | 13100 | 16500 | 16100 |
| Thermal Deformation Temp.[6] (°C.) | 107.9 | 127.4 | 135.9 | 141.0 | 124.9 | 116.5 | 133.4 | 121.9 |

|  | Example No. | | | Comparative Example No. | | | | |
|---|---|---|---|---|---|---|---|---|
|  | 9 | 10 | 11 | 1 | 2 | 3 | 4 | 5 |
| Composition (weight %) | | | | | | | | |
| PP | 65 | 60 | 65 | 90 | 70 | 50 | 30 | 65 |
| Polyester | | | | | | | | |
| PET | — | — | 30 | — | — | — | — | — |
| PBT | 30 | 30 | — | 10 | 30 | 50 | 70 | 30 |
| Graft Copolymer-1 | — | — | 5 | — | — | — | — | — |
| Graft Copolymer-2 | — | — | — | — | — | — | — | — |
| Graft Copolymer-3 | — | — | — | — | — | — | — | — |
| Graft Copolymer-4 | 5 | 10 | — | — | — | — | — | — |
| MAHPP | — | — | — | — | — | — | — | 5 |
| Properties | | | | | | | | |
| MFR (g/10 minutes)[1] | 26.4 | 15.3 | 42.3 | 22.0 | 28.1 | 32.4 | 34.7 | 27.4 |
| Surface Peel Resistance[2] | 98/100 | 99/100 | 72/100 | 10/100 | 0/100 | 0/100 | 0/100 | 0/100 |
| Izod Impact Resistance[3] (kgf·cm/cm) (−30° C.) | 5.6 | 7.0 | 3.0 | 2.1 | 1.8 | 1.7 | 4.0 | 1.5 |
| Bending Strength[4] (kgf/cm$^2$) | 347 | 330 | 273 | 231 | 124 | 105 | 420 | 120.4 |
| Flexural Modulus[5] (kgf/cm$^2$) | 18400 | 18100 | 14300 | 13600 | 16500 | 18900 | 21500 | 16700 |
| Thermal Deformation Temp.[6] (°C.) | 114.0 | 109.6 | 103.2 | 110.0 | 129.2 | 137.6 | 145.8 | 134.0 |

Note
[1]Melt flow rate
[2]Surface peel resistance
A surface of each sample was cut by a razor in a checkerboard pattern to have 100 separate square areas of 1 mm × 1 mm. A cellophane adhesive tape (manufactured by Nichiban Co., Ltd.) was adhered onto the sample surface and then peeled off. The number of remaining square areas was counted.
[3]Izod impact strength
Measured according to JIS K7110.
[4]Bending strength
Measured according to JIS K7203.
[5]Flexural modulus
Measured according to JIS K7203.
[6]Thermal deformation temperature
Measured according to JIS K7207.

As is clear from Table 1, the thermoplastic resin compositions of the present invention were all excellent in Izod impact resistance, flexural modulus, bending strength, thermal deformation temperature and surface peel resistance. On the other hand, the thermoplastic resin compositions in Comparative Examples 1–3 and 5 were poor in impact resistance and surface peel resistance. The thermoplastic resin composition of Comparative Example 4 was poor in surface peel resistance, although it has good mechanical strength and impact resistance.

EXAMPLES 13-22

Polypropylene, a polyester, a polyolefin-polyester graft copolymer and a modified polypropylene were dry-blended in proportions shown in Table 2. Each of the resulting mixtures was then introduced into a double-screw extruder of 45 mm in diameter, and subjected to blending in a molten state at 280° C. and 200 rpm to produce composition pellets.

Next, each of the resulting compositions was formed into test pieces for various property tests.

Each test piece was measured with respect to Izod impact strength, flexural modulus, bending strength, thermal deformation temperature and surface peel resistance. The results are shown in Table 2 together with the melt flow rate of each composition.

TABLE 2

|  | Example No. | | | | |
|---|---|---|---|---|---|
|  | 13 | 14 | 15 | 16 | 17 |
| Composition (weight %) | | | | | |
| PP | 60 | 40 | 20 | 55 | 60 |
| Polyester | | | | | |
| PET | — | — | — | — | — |
| PBT | 30 | 50 | 70 | 30 | 30 |
| Graft Copolymer-1 | 5 | 5 | 5 | 5 | — |
| Graft Copolymer-2 | — | — | — | — | 5 |
| Graft Copolymer-3 | — | — | — | — | — |
| Graft Copolymer-4 | — | — | — | — | — |
| CMPP-1 | 5 | 5 | 5 | 10 | 5 |

TABLE 2-continued

| | | | | | |
|---|---|---|---|---|---|
| CMPP-2 | — | — | — | — | — |
| Properties | | | | | |
| MFR (g/10 minutes)[1] | 34.0 | 27.3 | 27.4 | 39.0 | 37.0 |
| Surface Peel Resistance[2] | 100/100 | 100/100 | 100/100 | 100/100 | 100/100 |
| Izod Impact Resistance[3] (kgf·cm/cm) (−30° C.) | 3.0 | 3.4 | 5.7 | 3.8 | 2.8 |
| Bending Strength[4] (kgf/cm$^2$) | 315 | 275 | 450 | 321 | 303 |
| Flexural Modulus[5] (kgf/cm$^2$) | 16000 | 18300 | 20700 | 16000 | 16400 |
| Thermal Deformation Temp.[6] (°C.) | 128.0 | 136.4 | 141.5 | 128.1 | 130.1 |

| | Example No. | | | | |
|---|---|---|---|---|---|
| | 18 | 19 | 20 | 21 | 22 |
| Composition (weight %) | | | | | |
| PP | 60 | 60 | 60 | 60 | 60 |
| Polyester | | | | | |
| PET | — | — | — | — | 30 |
| PBT | 30 | 30 | 30 | 30 | — |
| Graft Copolymer-1 | — | 5 | — | — | 5 |
| Graft Copolymer-2 | — | — | — | — | — |
| Graft Copolymer-3 | 5 | — | — | — | — |
| Graft Copolymer-4 | — | — | 5 | 5 | — |
| CMPP-1 | 5 | — | 5 | — | 5 |
| CMPP-2 | — | 5 | — | 5 | — |
| Properties | | | | | |
| MFR (g/10 minutes)[1] | 39.5 | 24.3 | 39.0 | 21.0 | 45.3 |
| Surface Peel Resistance[2] | 100/100 | 100/100 | 100/100 | 100/100 | 100/100 |
| Izod Impact Resistance[3] (kgf·cm/cm) (−30° C.) | 2.9 | 5.6 | 7.2 | 7.9 | 3.5 |
| Bending Strength[4] (kgf/cm$^2$) | 312 | 308 | 363 | 372 | 285 |
| Flexural Modulus[5] (kgf/cm$^2$) | 15700 | 15800 | 18800 | 18200 | 14500 |
| Thermal Deformation Temp.[6] (°C.) | 124.2 | 124.0 | 119.3 | 116.4 | 103.3 |

Note
[1] Melt flow rate
Measured according to JIS K6758.
[2] Surface peel resistance
A surface of each sample was cut by a razor in a checkerboard pattern to have 100 separate square areas of 1 mm × 1 mm. A cellophane adhesive tape (manufactured by Nichiban Co., Ltd.) was adhered onto the sample surface and then peeled off. The number of remaining square areas was counted.
[3] Izod impact strength
Measured according to JIS K7110.
[4] Bending strength
Measured according to JIS K7203.
[5] Flexural modulus
Measured according to JIS K7203.
[6] Thermal deformation temperature
Measured according to JIS K7207.

As is clear from Table 2, the thermoplastic resin compositions of the present invention were all excellent in Izod impact resistance, flexural modulus, bending strength, thermal deformation temperature and surface peel resistance.

As described above in detail, since the thermoplastic resin composition of the present invention comprises polypropylene, a polyester, a polyolefin-polyester graft copolymer and optionally a modified polypropylene, it is excellent in impact resistance and mechanical strength without suffering from surface peel.

Such thermoplastic resin compositions are suitable for interior and exterior parts of automobiles, parts of various electric appliances, etc.

What is claimed is:

1. A thermoplastic resin composition comprising:
   (a) 10–90 weight % of polypropylene;
   (b) 90–10 weight % of polyethylene terephthalate or polybutylene terephthalate; and
   (c) 5–30 parts by weight, per 100 parts by weight of the total of said (a)+said (b), of a polyolefin-polyester graft copolymer, said polyolefin-polyester graft copolymer comprising (A) 10–80 parts by weight of polyethylene terephthalate having an intrinsic viscosity [η] of 0.30–0.80 and an end carboxyl group content of 20 15–200 milliequivalent/kg and/or polybutylene terephthalate having an intrinsic viscosity [η] of 0.30–1.20 and an end carboxyl group of 15–200 milliequivalent/kg; and (B) 90–20 part; by weight of a modified polypropylene prepared by grafting a polypropylene random copolymer containing an unconjugated diene comonomer represented by the following general formula:

$$CH_2=C-(CH_2)_n-C=C-R_4$$
$$\phantom{CH_2=}|\phantom{(CH_2)_n-}|\phantom{C=}|$$
$$\phantom{CH_2=C}R_1\phantom{CH_2)_n-}R_2\phantom{=C-}R_3$$

wherein $R_1$–$R_4$ are H or alkyl groups having 1–6 carbon atoms, and n is an integer of 1–20, with an unsaturated carboxylic acid or an anhydride thereof, said modified polypropylene having a carboxyl group content of 0.2–5 mol % and a weight-average molecular weight of 8,000–140,000.

* * * * *